United States Patent
Kojima et al.

(10) Patent No.: US 11,530,667 B2
(45) Date of Patent: Dec. 20, 2022

(54) CYLINDER HEAD

(71) Applicant: MITSUBISHI JIDOSHA KOGYO KABUSHIKI KAISHA, Tokyo (JP)

(72) Inventors: Mitsutaka Kojima, Tokyo (JP); Shinichi Murata, Tokyo (JP); Hiroshi Ishii, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/420,796

(22) PCT Filed: Dec. 25, 2019

(86) PCT No.: PCT/JP2019/050940
§ 371 (c)(1),
(2) Date: Jul. 6, 2021

(87) PCT Pub. No.: WO2020/145153
PCT Pub. Date: Jul. 16, 2020

(65) Prior Publication Data
US 2022/0112859 A1    Apr. 14, 2022

(30) Foreign Application Priority Data
Jan. 7, 2019   (JP) .............................. JP2019-000829

(51) Int. Cl.
*F02F 1/42*   (2006.01)
*F02F 11/00*   (2006.01)

(52) U.S. Cl.
CPC ............ *F02F 1/425* (2013.01); *F02F 1/4257* (2013.01); *F02F 11/002* (2013.01)

(58) Field of Classification Search
CPC ......... F02F 11/002; F02F 1/4257; F02F 1/425
See application file for complete search history.

(56) References Cited

U.S. PATENT DOCUMENTS

| 6,026,774 A * | 2/2000 | Kajihara | .................. F02F 11/00 |
| | | | 123/184.21 |
| 2018/0215081 A1* | 8/2018 | Arima | ..................... B29C 33/76 |

FOREIGN PATENT DOCUMENTS

| JP | 2-69043 U | 5/1990 |
| JP | 5-38337 U | 5/1993 |

(Continued)

OTHER PUBLICATIONS

International Preliminary Report on Patentability and English translation of the Written Opinion of the International Searching Authority for International Application No. PCT/JP2019/050940, dated Jun. 16, 2021.

(Continued)

*Primary Examiner* — Kevin A Lathers
(74) *Attorney, Agent, or Firm* — Birch, Stewart, Kolasch & Birch, LLP

(57) ABSTRACT

A cylinder head (1) disclosed herein includes a cylinder head main body (10) having an intake port (3) communicating with a combustion chamber (2) of an engine; and an insulation member (20) being arranged at an inner side of the intake port (3), made of resin, and formed into an annular shape. A step part (14) is formed at a downstream side of the insulation member (20) in a flow direction of intake air in the intake port (3) such that the intake port (3) has a cross section perpendicular to the flow direction at the downstream side smaller than a cross section perpendicular to the flow direction at an upstream side of the flow direction; and an annular seal member (21) that seals a space between the insulation member (20) and the step part (14) is arranged between the insulation member (20) and the step part (14).

19 Claims, 6 Drawing Sheets

(56) References Cited

FOREIGN PATENT DOCUMENTS

| | | |
|---|---|---|
| JP | 2004-204796 A | 7/2004 |
| JP | 2007-56794 A | 3/2007 |
| JP | 2017-110528 A | 6/2017 |
| JP | 2018-3600 A | 1/2018 |

OTHER PUBLICATIONS

International Search Report, issued in PCT/JP2019/050940, PCT/ISA/210, dated Mar. 10, 2020.
Written Opinion of the International Searching Authority, issued in PCT/JP2019/050940, PCT/ISA/237, dated Mar. 10, 2020.
Extended European Search Report dated Feb. 2, 2022 issued in corresponding European Patent Application No. 19 909 044.0.
Japanese Office Action dated Jan. 18, 2022 issued in corresponding Japanese Patent Application No. 2020-565698 with an English Translation.
Chinese Office Action and Search Report for Chinese Application No. 201980088166.4, dated Jul. 18, 2022, with English translation of the Office Action.
Japanese Office Action for Japanese Application No. 2020-565698, dated Jul. 5, 2022, with English translation.

\* cited by examiner (a)

(b)

(c)

(a)

(b)

CYLINDER HEAD

TECHNICAL FIELD

This disclosure relates to a cylinder head of an engine.

BACKGROUND TECHNIQUE

A typical cylinder head of an engine is molded by casting with aluminum or an aluminum alloy, for example, and therefore has a relatively high thermal conductivity.

Consequently, an intake port communicating with the combustion chamber is heated by heat transferred from the combustion chamber, which causes a temperature rise of the intake air flowing through the intake port. When the temperature of the intake air rises, the intake air volume decreases and knocking tends to occur, which may degrade the engine performance. As one of the solutions to this problem, Patent Document 1 discloses a structure of an intake passage of an engine, which aims at suppressing a temperature rise of the intake air by arranging a resin insulation member on the inner surface of an intake port, for example.

PRIOR ART REFERENCE

Patent Document

[Patent Document 1] Japanese Laid-open Patent Publication No. 2018-3600

SUMMARY

Problems

In a structure that places a resin insulation member (resin member) in an intake port of a cylinder head molded with a material such as aluminum as performed in Patent Document 1 described above, it is essential not to hinder the flow of the intake air by the insulation member. This is because, despite the effort to suppress a rise of an intake air temperature using an insulation member, a possible increase in air intake resistance reduces an advantage of arranging the insulation member.

Further, an example of a method of placing a resin insulation member on the inner surface of the intake port is injection molding as described in above Patent Document 1. Specifically, the method involves inserting and fixing a mold to the part to be an intake port of a cylinder head molded by casting, and filling a space between the inner surface of this part and the outer surface of the mold with resin. When this method is adopted, it is important to secure the sealing surface so that the resin does not leak out from the space. However, being a casting and having a rough dimensional accuracy, the cylinder head itself problematically has a difficulty in securing the sealing surface. As a solution to this problem, it is conceivable to secure the sealing surface by machining the inner surface of the part to be the intake port, but machining by inserting a tool into a narrow space on the side of the combustion chamber is difficult, considering, for example, a machining time, a machining accuracy, and a machining cost.

With the foregoing problems in view, one of the objects of the cylinder head of the present embodiment is to enhance the accuracy in registering of a resin insulation member to be placed in the intake port and avoids an increase in the air intake resistance. It addition to the above object, an advantageous effect that is derived from each configuration shown in the following detailed modes to carry out the present disclosure and which is not obtained by the conventional technique can be regarded as another object of the present disclosure.

Means to Solve the Problem (1) A cylinder head disclosed herein includes a cylinder head main body having an intake port communicating with a combustion chamber of an engine; and an insulation member being arranged at an inner side of the intake port, made of resin, and formed into an annular shape. A step part is formed at a downstream side of the insulation member in a flow direction of intake air in the intake port such that the intake port has a cross section perpendicular to the flow direction at the downstream side smaller than a cross section perpendicular to the flow direction at an upstream side of the flow direction; and an annular seal member that seals a space between the insulation member and the step part is arranged between the insulation member and the step part.

(2) The seal member is preferably be an elastic body.

(3) The seal member and the insulation member are preferably different in material.

(4) On the cylinder head main body, a communicating hole through which a valve guide is placed is preferably formed so as to communicate with the intake port. In this case, the step part is preferably disposed at an upstream side in the flow direction of an opening of the communicating hole.

(5) The seal member preferably includes a wall part along an inner face of the intake port under a state where the seal member is fitted into the step part.

(6) The intake port is preferably formed into a bifurcated shape that communicates with the combustion chamber through two intake valve holes; and the step part is preferably positioned at a bifurcation point at which the intake port bifurcates or at a downstream side in the flow direction of the bifurcation point.

(7) In the above case (6), the seal member preferably includes two annular parts adapted to fit into the step part in the bifurcated shape and a connecting part that connects the two annular parts.

(8) In the above case (7), the connecting part is preferably thinner than each of the annular parts.

Effects

The cylinder head disclosed herein can enhance the accuracy in registering of an insulation member placed inside the intake port. Therefore, it is possible to avoid both an increase in the air intake resistance caused by resin flowing out of the insulation member and an increase in the air intake resistance caused by a rise of part of the tip of the insulation member in the intake port, thereby contributing to an enhancement in engine performance. Furthermore, since the temperature rise of the intake air can also be suppressed by the insulation member, decrease in the intake air volume and occurrence of knocking can be both suppressed, so that the engine performance can be enhanced.

DETAILED DESCRIPTION

Figure 1:
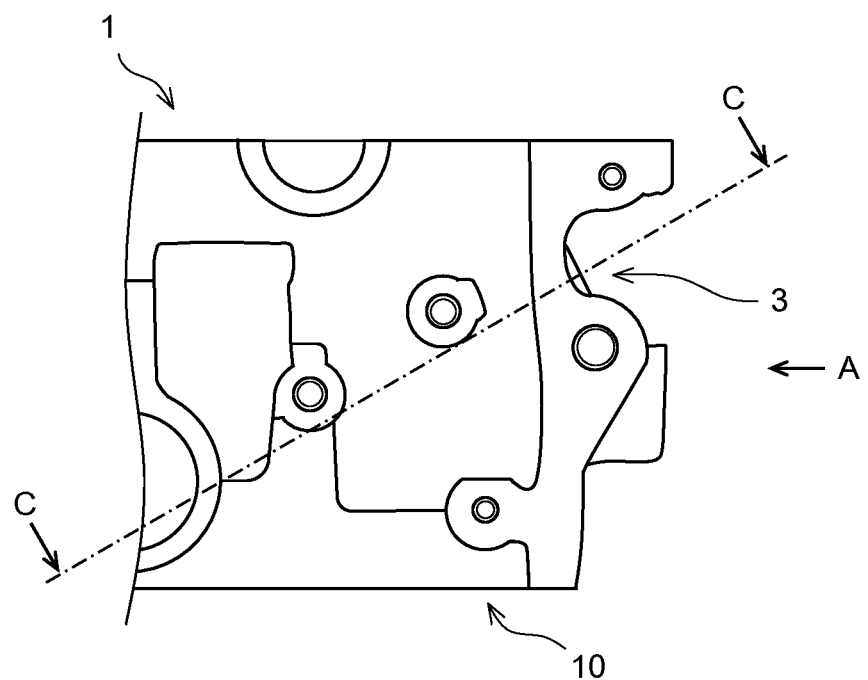
FIG. 1 is schematic front view showing an intake-side part of a cylinder head according to an embodiment, viewed from the front side of an engine.

Referring to the drawings, a cylinder head according to an embodiment will now be described. The following embodiment is merely illustrative and is not intended to exclude the application of various modifications and techniques not explicitly described in the embodiment. Each configuration of the present embodiment can be variously modified and implemented without departing from the scope thereof. Besides, the configurations can be each selected or omitted according to the requirement, and can be appropriately combined.

[1. Structure of Cylinder Head]

Figure 2:
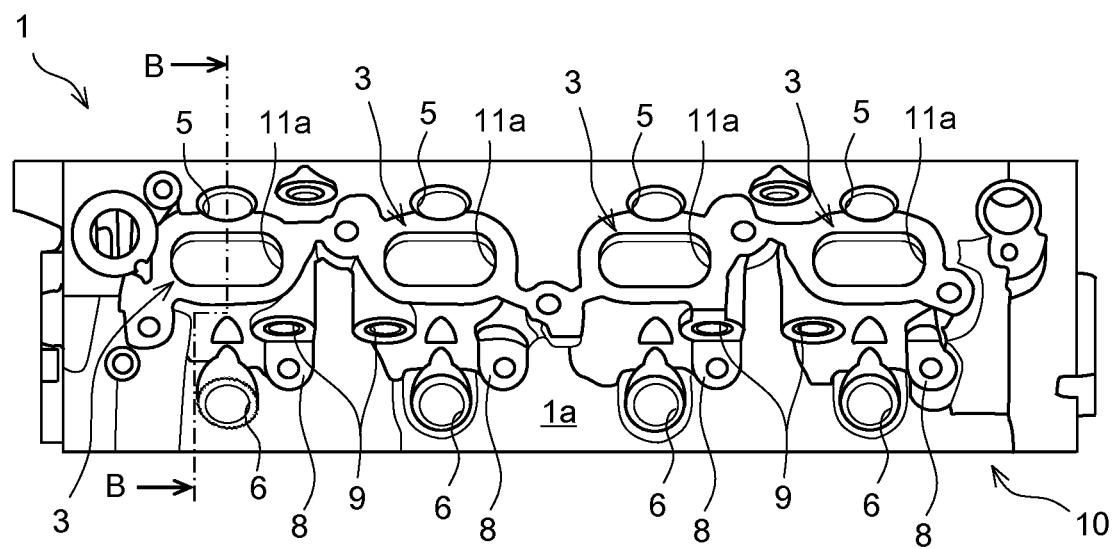
FIG. 2 is a schematic side view of the cylinder head of FIG. 1, viewed from the intake side (seen along A-direction arrow in FIG. 1)

FIG. 1 is schematic front view showing an intake-side part of a cylinder head 1 according to the embodiment, viewed from the front side of an engine, and FIG. 2 is a schematic side view of the cylinder head 1 (seen along A-direction arrow in FIG. 1). The cylinder head 1 is, for example, a component constituting an engine to be mounted on a vehicle. The present embodiment exemplifies the cylinder head 1 of an engine provided with four cylinders arranged in a row, each of which cylinder has two intake valves and two exhaust valves. Further, the engine of the present embodiment is equipped with an in-cylinder injection valve (not shown) that injects fuel into a combustion chamber 2 (see FIG. 3) and a port injection valve (not shown) that injects fuel into an intake port 3.

Figure 3:
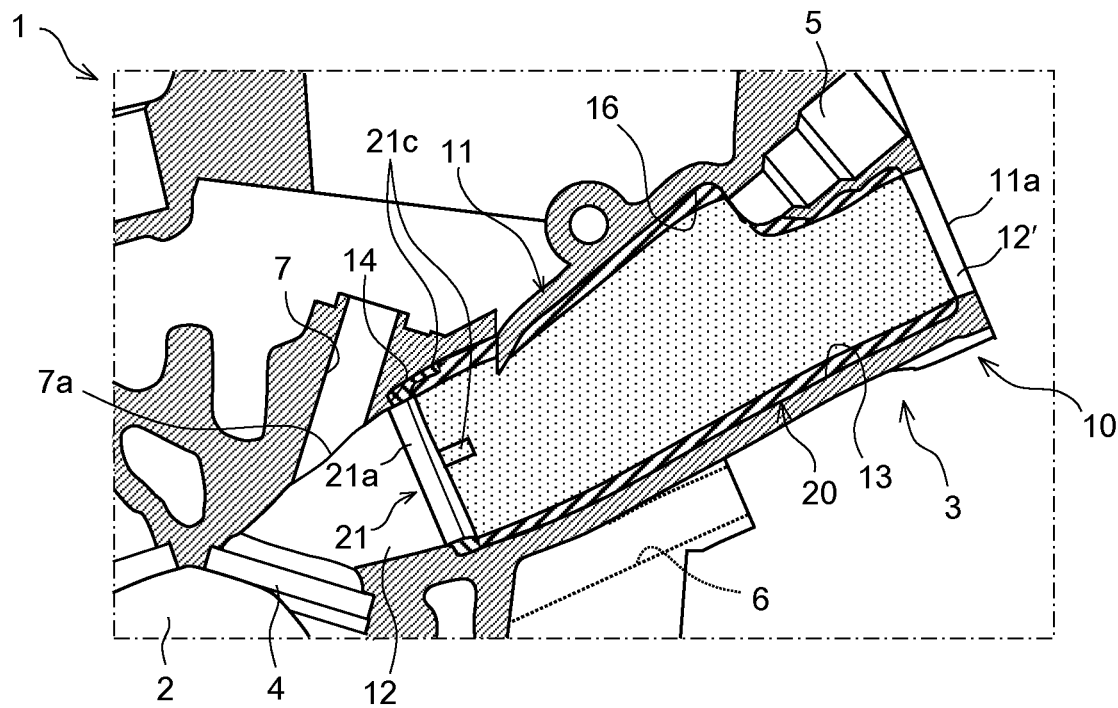
FIG. 3 is a cross sectional view showing the structure around the intake port of the cylinder head of FIG. 1 (cross sectional view taken by the line represented by B-B arrows in FIG. 2)

FIG. 3 is a cross sectional view showing a structure around the intake port 3 (cross sectional view taken by the line represented the B-B arrows in FIG. 2).

As shown in FIGS. 2 and 3, the cylinder head 1 includes a cylinder head main body 10 molded by casting, for example, aluminum or an aluminum alloy, and an insulation member 20 and a seal member 21 (see FIG. 3) that are to be detailed below. On the cylinder head 1, the intake port 3, a mounting hole 5 for the port injection valve, and a mounting hole 6 of the in-cylinder injection valve are formed for each cylinder. The intake port 3 and the mounting holes 5 and 6 open to a wall part 1a on the intake side of the cylinder head 1. Further, on this wall part 1a, a mounting part 8 to which a delivery pipe connected to the in-cylinder injection valve is fixed, and an inlet 9 for supplying a molten resin to be an insulation member 20 (see FIG. 3) that is to be described below are formed.

Figure 4:
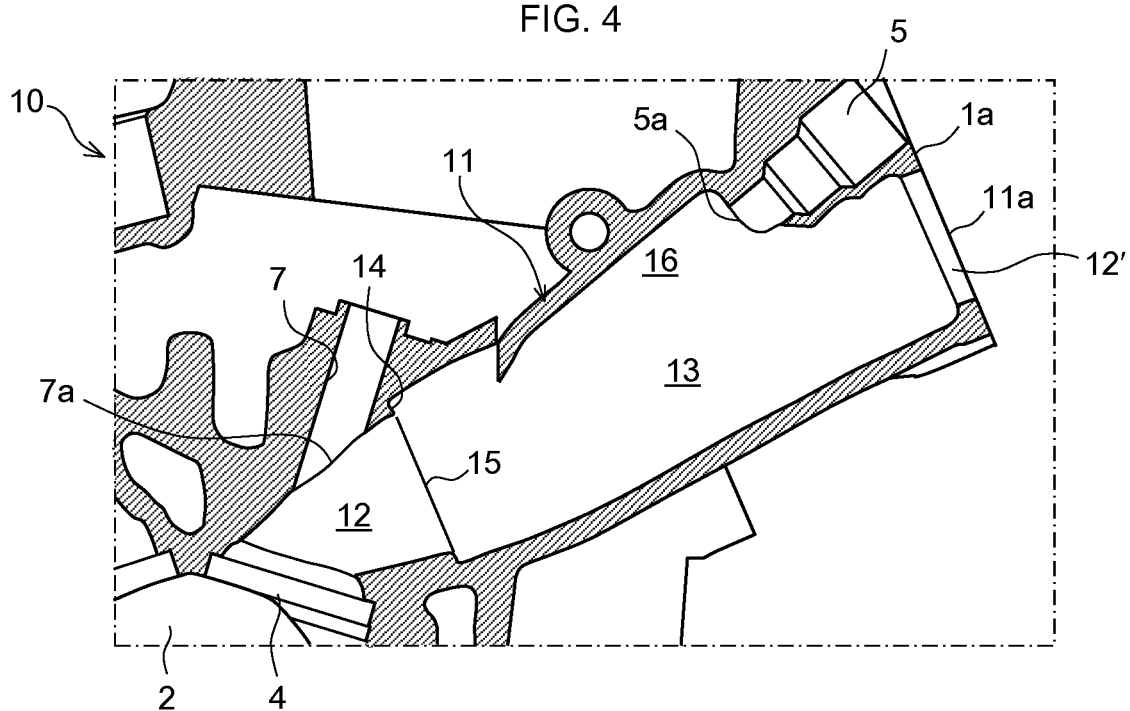
FIG. 4 is a cross sectional view showing only a cylinder head main body, imaginary excluding an insulation member from the cross sectional view of FIG. 3.

The cylinder head main body 10 constitutes the main body part of the cylinder head 1, and as shown in FIGS. 3 and 4, includes the combustion chamber 2 and the mounting holes 5 and 6 and further a main body part 11 (a portion serving as the intake port 3) that forms the intake port 3, for example. FIG. 4 is a cross sectional view showing only cylinder head main body 10 excluding the insulation member 20 and the seal member 21 from the cross sectional view of FIG. 3. The main body part 11 (intake port 3) of the present embodiment is formed in a bifurcated shape which communicates with the combustion chamber 2 via two intake valve holes 4 (see FIG. 6). FIGS. 3 and 4 omit the illustration of a wall part that bifurcates the main body part 11.

On the cylinder head main body 10 of the present embodiment, a communicating hole 7 through which a non-illustrated valve guide is inserted and the mounting hole 5 for the port injection valve are formed so as to communicate with the main body part 11. Furthermore, on the main body part 11, an expanding part 16 that widens toward the side (upper side in FIG. 4) to which the port injection valve is installed, an opening 5a of the mounting hole 5, and an opening 7a of the communicating hole 7 are formed.

As shown in FIG. 3, the insulation member 20 is disposed on the inner side of the intake port 3 (along the inner surface of the main body part 11), and is an annular member that suppresses the heat of the cylinder head main body 10 from transferring to the intake air. The insulation member 20 is formed of a resin having lower thermal conductivity than that of the material of the cylinder head main body 10, and more preferably is formed of a resin having a high heat resistance. For easily grasping, the insulation member 20 is indicated by being dotted in FIG. 3.

The insulation member 20 is provided on the upstream side of the flow direction of the intake air (hereinafter, simply referred to as "upstream side") and is a portion for widely covering the inner surface of the main body part 11. On the other hand, the seal member 21 is an annular member provided continuously with the insulation member 20 on the downstream side of the flow of the intake air (hereinafter, simply referred to as "downstream side") than the insulation member 20. The word "continuously" here represents not only a state of being completely integrated (a state that continues without an interruption), but also a state in which the seal member 21 and the insulation member 20 are seen (as if) to be integrated (including a state in which bubbles adhere to the fixing surface).

The insulation member 20 and the seal member 21 may be the same or different in material as or from each other. The present embodiment assumes an example in which the insulation member 20 and the seal member 21 are different in material. In this case, it is preferable that the material of the seal member 21 is more flexible than that of the insulation member 20. The present embodiment assumes a case where the seal member 21 is a non-metallic elastic body (e.g., resin or rubber).

As shown in FIG. 3, the insulation member 20 is disposed to cover a range of the overall length of main body part 11 excluding the portion (i.e., the downstream portion) on the side of the combustion chamber 2. In other words, the main body part 11 has a portion where the insulation member 20 is not disposed and a portion where the insulation member 20 is disposed. Hereinafter, the former portion is called an exposed part 12, and the latter portion is called a covered part 13. This means that the exposed part 12 is a portion where the material surface of the cylinder head main body 10 comes into directly contact with (exposed to) the intake air whereas the covered part 13 is a portion where the material surface of the cylinder head main body 10 is covered with the insulation member 20 and is out of directly contact with the intake air. The insulation member 20 constitutes the inner surface of the intake port 3 in conjunction with the exposed part 12.

As shown in FIGS. 3 and 4, the exposed part 12 is located on the side of the combustion chamber 2 of the main body part 11, and the covered part 13 is located on the upstream side of the exposed part 12. The covered part 13 is formed to have a cross section (hereinafter, simply referred to as "cross section") perpendicular to the flow direction of the intake air larger than that of the exposed part 12. With this structure, the boundary between the exposed part 12 and the covered part 13, a step part 14 changing the size of its cross section is provided. In other words, on the downstream side of the insulation member 20 in the intake port 3, the step part 14 is formed so as to have a size of the cross section coming to be smaller than the upstream side. In the present embodiment, the portion of the main body part 11 from the opening 11a formed on the wall part 1a of the cylinder head main body 10 to the step part 14 is formed in a straight line. To the opening 11a of the main body part 11, a non-illustrated intake manifold is connected.

The step part 14 of the present embodiment is positioned at a bifurcation point 15 (see FIGS. 4 and 6) at which the main body part 11 (the intake port 3) bifurcates or at a downstream side of the bifurcation point 15. Further, the step part 14 is positioned on the upstream side of the opening 7a of the communicating hole 7 through which a valve guide is inserted. This means that two step parts 14 are provided in a single main body part 11, and each step part 14 is provided apart from the combustion chamber 2. The cylinder head main body 10 of the present embodiment is narrowed at the end on the side of the wall part 1a of the main body part 11 (i.e., upstream end of the flow direction of the intake air), and a second exposed part 12' on which the insulation member 20 is not disposed is provided at this narrowed portion.

Here, the structure of the seal member 21 of the present embodiment will now be detailed. The seal member 21 is positioned between the insulation member 20 and the step part 14 and has a function of sealing therebetween (i.e., sealing the space between the insulation member 20 and step part 14 by being in intimate contact with the both elements 14 and 20). The seal member 21 of the present embodiment has two annular parts 21a that are to be fitted in the step part 14 in the bifurcated shape, and a connecting part 21b that connects the two annular parts 21a to each other.

Figure 5:
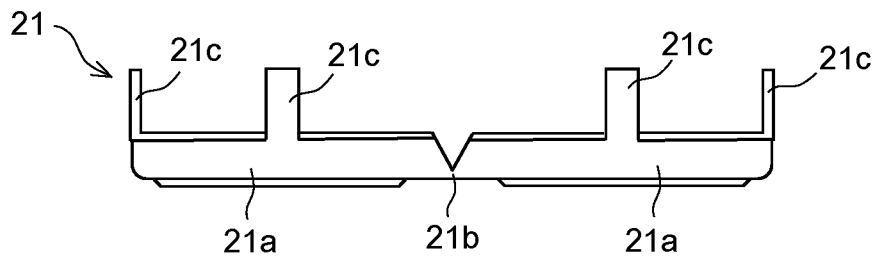
FIG. 5(a) and FIG. 5(b) are a plan view and a front view of a seal member.
FIG. 5(c) is a plan view showing a state when the seal member is inserted into the intake port.
Figure 5:
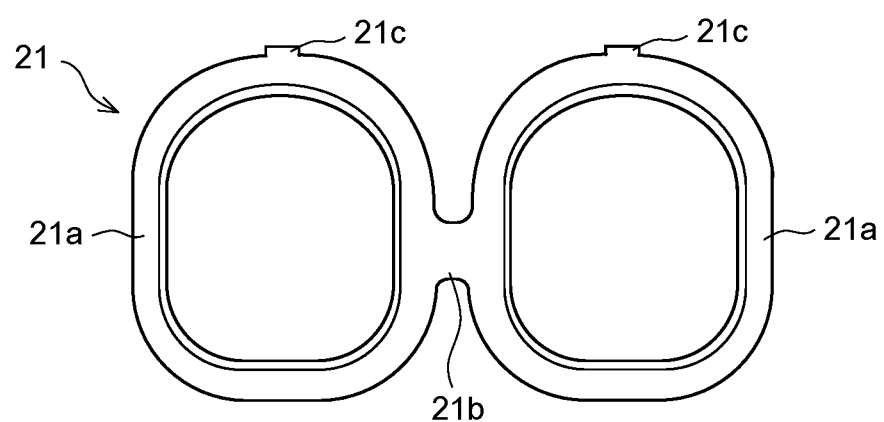
Figure 5:
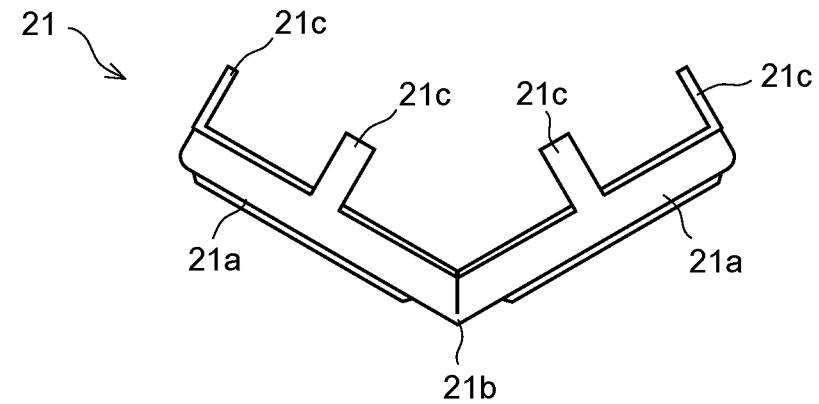

FIGS. 5(a) and 5(b) are a plan view and a front view showing the seal member 21 having the annular parts 21a taken out from the cylinder head main body 10, respectively. As shown in FIGS. 5(a) and 5(b), the seal member 21 of the present embodiment has a structure in which the two annular parts 21a are connected by a single connecting part 21b and therefore looks like a shape of eyeglasses.

Each annular part 21a is an annular portion fitted in the step part 14 and corresponds to the edge (so-called rim) of the lens when being applied to eyeglasses. Each annular part 21a has an outer shape coinciding with the cross section of the step part 14 and has a substantially uniform thickness in the circumferential direction. The two annular parts 21a are formed in a mirror-symmetric shape and adjoin with a gap between them. The connecting part 21b is a portion that connects the two annular parts 21 at the point where the two annular parts come the closest to each other and corresponds to bridges when being applied to eyeglasses. The connecting part 21b is thinner than each of the annular parts 21a, and as shown in FIG. 5(c), the connecting part 21b easily bends in the direction in which the two annular parts 21a come closer to each other. Alternatively, the seal member 21 may be formed into a more bendable structure by providing a notch that assists the bending to the connecting part 21b.

The seal member 21 of the present embodiment is further provided with wall parts 21c extending in the same direction from two points on each of the annular parts 21a. As shown in FIG. 3, the wall parts 21c serve as portions disposed along the inner face of the covered part 13 of the intake port 3 in a state where the seal member 21 is fitted in the step part 14, and as shown in FIG. 5(c), extends toward a direction to be the inside when the seal member 21 is bent. The wall parts 21c have functions of keeping the posture of the seal member 21 when the seal member 21 is installed in the main body part 11, and a function of promoting integration with molten resin when the molten resin that is to serve as the insulation member 20 is injected. In the illustrated example, the seal member 21 is assumed to have two wall parts 21c provided at 90 degrees apart from each other on each annular part 21a, but the number and the arrangement of the wall parts 21c are not limited to this.

The thicknesses of the insulation member 20 and the seal member 21 are set according to the difference (height difference of the step part 14) in the size of the cross section of the covered part 13 from the exposed part 12. This is because if the inner surface of the exposed part 12 is smoothly connected to the inner surfaces of the insulation member 20 and the seal member 21, it is possible to avoid an increase in the air intake resistance. That is, when the height difference of the step part 14 are set to be substantially the same as the thicknesses of the insulation member 20 and the seal member 21, the insulation member 20, the seal member 21, and the exposed part 12 can form a flush inner surface under a state where the seal member 21 is fitted in the step part 14 and also the insulation member 20 is disposed on the covered part 13.

[2. Method of Manufacturing Cylinder Head]

Next, description will now be made in relation to a method of manufacturing the cylinder head 1 by arranging the insulation member 20 and the seal member 21 in the main body part 11 of the above cylinder head main body 10 with reference to FIGS. 6 to 10. It should be noted that the seal member 21 having a shape shown in FIGS. 5(a) to 5(c) is prepared in advance. On the other hand, the insulation member 20 is formed by injection molding carried out after the seal member 21 is placed inside the main body part 11.

Figure 6:
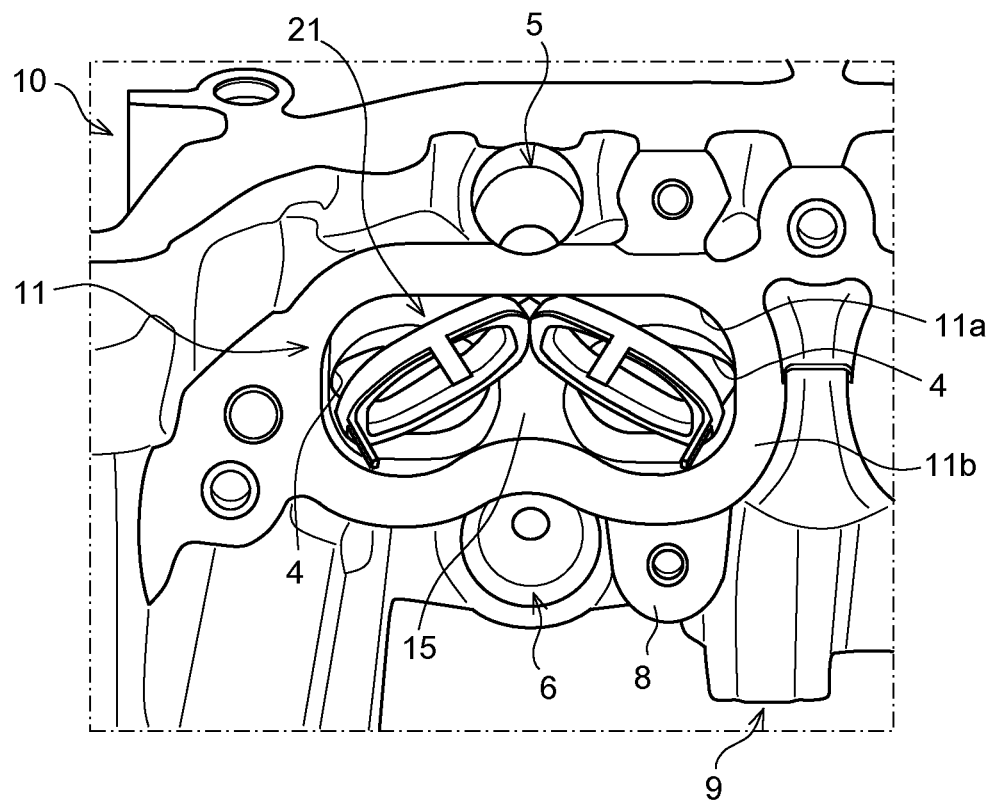
FIG. 6 is an enlarged side view showing a state when the seal member shown in FIG. 5(c) is inserted into the intake port.
Figure 7:
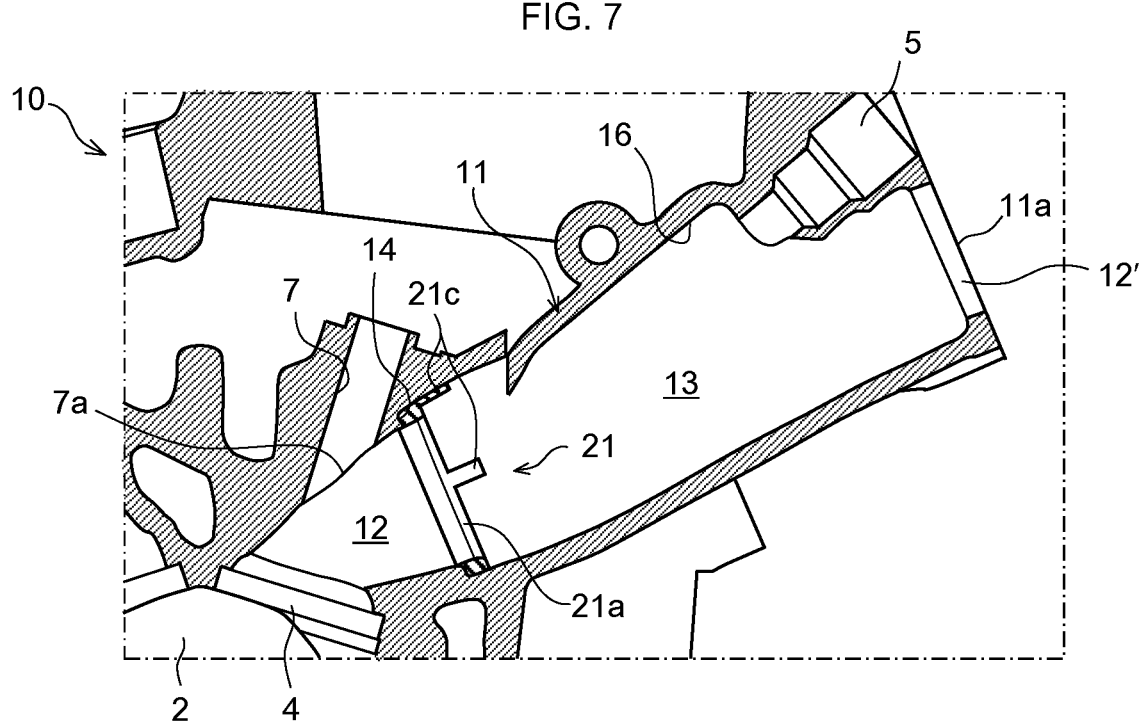
FIG. 7 is a cross sectional view showing a state where the seal member is fitted in a step part of the intake port shown in FIG. 4.

First, as shown in FIG. 6, the seal member 21 is inserted through the opening 11a of the main body part 11 which opening 11a is formed on wall part 1a. Since the opening 11a of the main body part 11 is smaller than the cross section in the middle of the main body part 11, the seal member 21 is inserted, being in a folded state as shown in FIG. 5(c). Then, as shown in FIG. 7, the seal member 21 is fitted into the step part 14.

Then, a mold 30 is inserted through the opening 11a and the tip portion of the mold 30 is brought into an intimate contact with the seal member 21. Here, an example of the mold 30 is shown in FIGS. 8(a) and 8(b). The mold 30 of the present embodiment has an outer shape smaller than the inner shape of the main body part 11, and is of a sliding mold formed by combining multiple components divided along a direction (i.e., the flow direction of the intake air) to be inserted into the main body part 11. Specifically, the mold 30 includes an upper mold 31 disposed on an upper portion including the expanding part 16 of the main body part 11, a lower mold 32 disposed below the upper mold 31, a center mold 33 disposed between the upper mold 31 and the lower mold 32, side molds 34 disposed on at least the both sides of the center mold 33, and a valve mold 35 inserted into the mounting hole 5.

Figure 8:
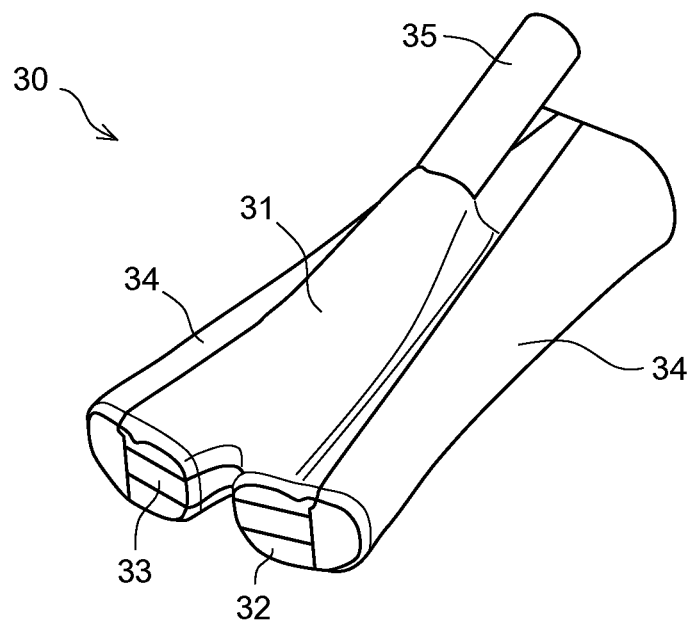
FIG. 8 is perspective views showing an example of a sliding mold for molding the intake port shown in FIG. 3, FIG. 8(a) being a state of being completely assembled, FIG. 8(b) being a state of shifting one side mold.
Figure 8:
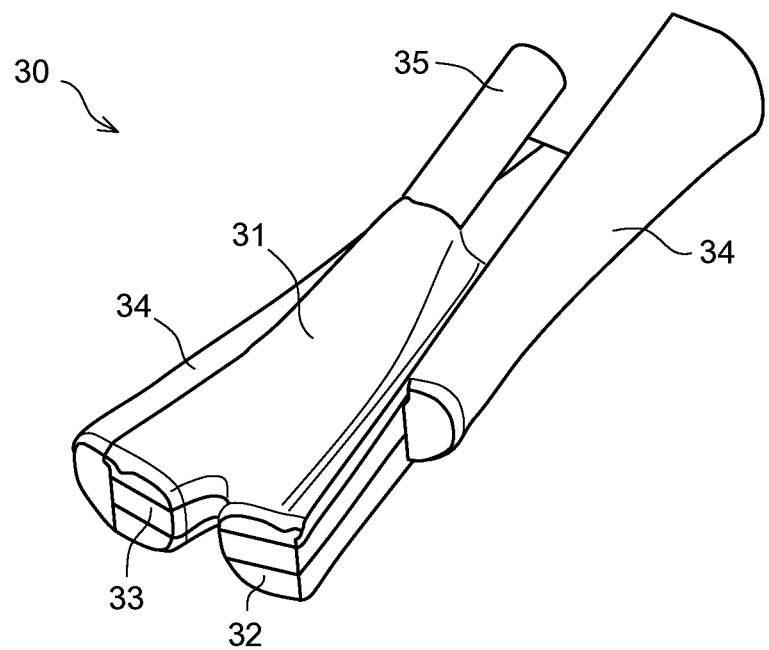
Figure 9:
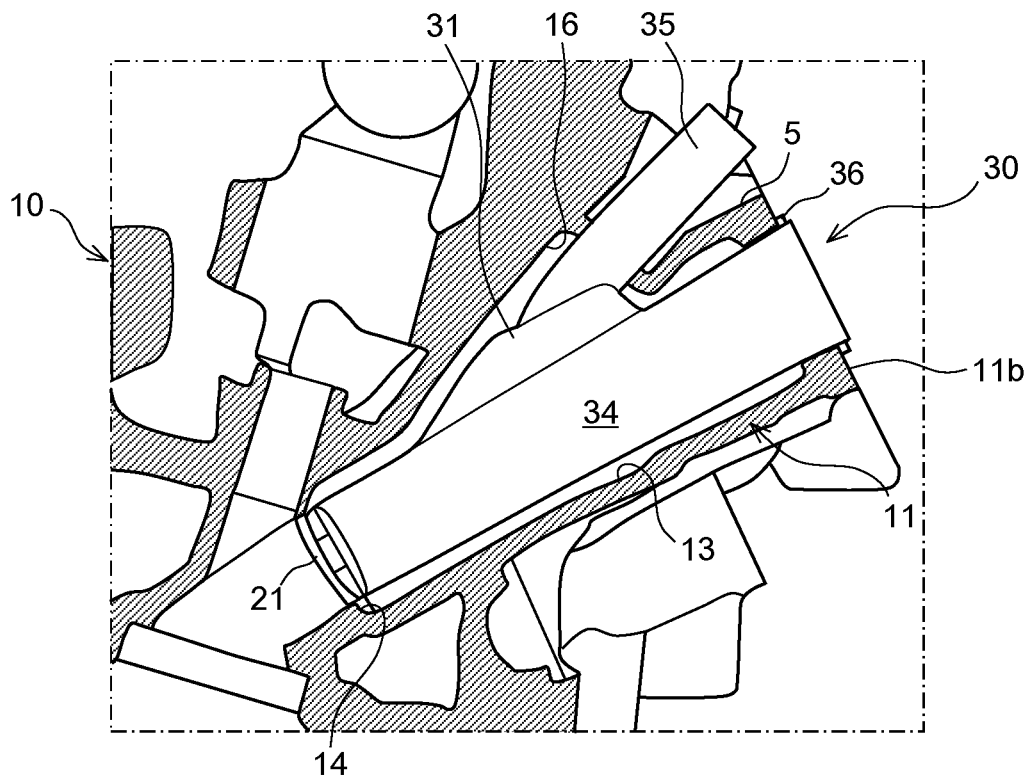
FIG. 9 is a cross sectional view showing a state of inserting the sliding mold shown in FIG. 8(a)
Figure 10:
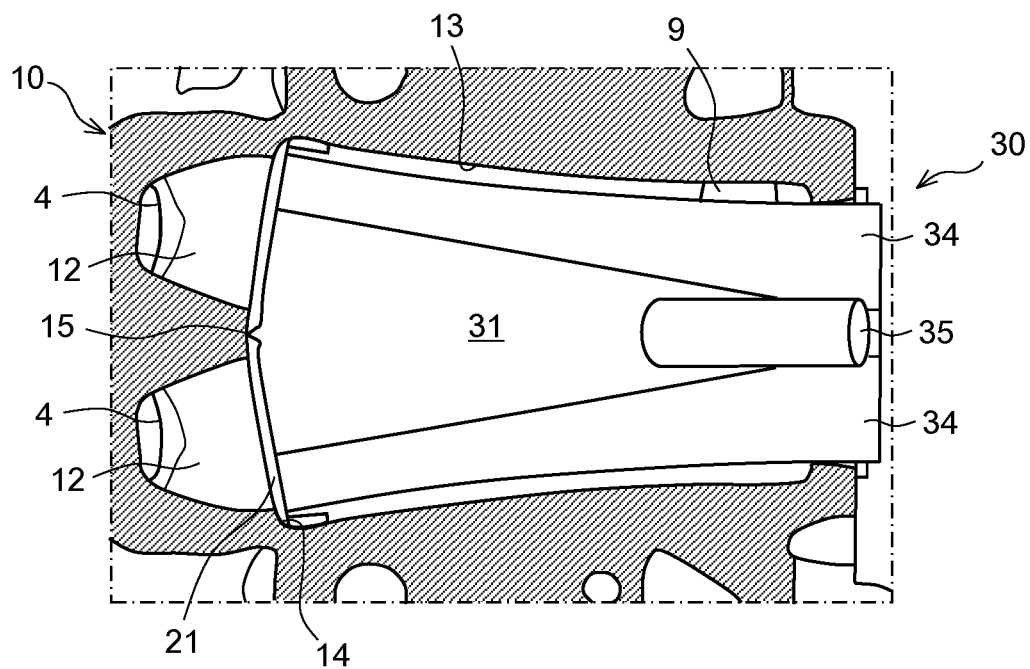
FIG. 10 is a cross sectional view showing a state of inserting the sliding mold shown in FIG. 8(a) (cross sectional view corresponding to a cross sectional view taken by the line represented by C-C arrows in FIG. 1).

Here, the side molds 34 shown in FIGS. 8 (*a*) and 8(*b*) are each formed in a shape in contact with the entire both sides of the upper mold 31 and the lower mold 32. As shown in FIG. 8(*b*), the side molds 34 are slidably formed with respect to the molds 31 to 33. Further, the center mold 33 is slidably formed with respect to both the upper mold 31 and the lower mold 32. Further, the valve mold 35 is formed in a shape to be fitted to the upper mold 31 and has a function of holding the upper mold 31.

The sequence of inserting the sliding mold 30 is: first, inserting the upper mold 31 through the opening 11*a* to be accommodated in the expanding part 16, and then under this state, inserting the valve mold 35 through the mounting hole 5 to be fitted to the upper mold 31. Then, the lower mold 32 is inserted through the opening 11*a*, and the center mold 33 is inserted while sliding with respect to the upper mold 31 and the lower mold 32, so that the three molds 31 to 33 are assembled inside the main body part 11. Finally, by inserting each of the two side molds 34 while sliding with respect to the three molds 31 to 33, the sliding mold 30 is made into a state shown in FIG. 10. As described above, the tip portion of the sliding mold 30 is brought into intimate contact with the member to be serve as the annular part 21.

Then, molten resin that is to serve as the insulation member 20 is supplied to the inside of the main body part 11 in which the sliding mold 30 is arranged. Since the cylinder head main body 10 of the present embodiment is provided with the inlets 9 for supplying the molten resin for each cylinder, the molten resin is injected under a state where non-illustrated injections are connected to the respective inlets 9. The molten resin spreads into a space formed between the inner surface of the main body part 11 and the outer surface of the sliding mold 30.

Here, the edge portion on the side of the combustion chamber 2 in the space where the molten resin spreads is sealed by the seal member 21 fitted in the step part 14. This avoids leakage of the resin to the combustion chamber 2. On the other hand, while the sliding mold 30 is placed in the main body part 11, a slight gap is formed between the narrowed portion at the upstream side of the main body part 11 and the sliding mold 30. Although having a function of absorbing the positional deviation of the sliding mold 30, the gap has a possibility of generating leakage of the molten resin. Therefore, on the slide mold 30 of the present embodiment, a component 36 for cutting burr is mounted so as to be in an intimate contact with a flange surface 11*b* (see FIGS. 6 and 9) of the opening 11*a* of the main body part 11. This seals also the edge portion on the side of the opening 11*a* side in the space where the molten resin spreads, and the leakage of the resin can be avoided.

The molten resin is solidified and integrated with the seal member 21, so that the insulation member 20 and the seal member 21 are integrated. After that, the sliding mold 30 is pull out in the reverse order to the order of inserting the sliding mold 30. Specifically, the two side molds 34 are pulled out by sliding, and then the center mold 33 is pulled out. Next, the lower mold 32 is pulled out after being raised to the space formed by pulling out the center mold 33. Furthermore, the valve mold 35 is pulled out and the upper mold 31 is pulled out after being lowered to the space formed by pulling out the center mold 33 and the lower mold 32. By pulling out the side molds 34 and the center mold 33 first as the above, the lower mold 32 and the upper mold 33 can be pulled out, avoiding possible contact with the inner surface of the insulation member 20 as much as possible.

[3. Actions and Effects]

(1) Since the cylinder head 1 described above is provided with the step part 14 that changes the size of its cross section in the intake port 3 and arranges the seal member 21 that seals the space between the step part 14 and the insulation member 20, the accuracy in registering of the insulation member 20 disposed in the intake port 3 can be increased by the seal member 21, and burrs generated by the molding can be suppressed. Therefore, it is possible to avoid an increase in the air intake resistance resulting from arranging the insulation member 20 and the seal member 21.

Further, since the seal member 21 does not protrude into the intake port 3, the insulation member 20 and the exposed part 12 of the intake port 3 can be smoothly connected under a state where the step therebetween is reduced as much as possible. This means that since a flush inner surface can be formed, an increase in the air intake resistance due to a partial reduction of the cross-sectional area in the intake port 3 and the increase in the air intake resistance due to rise of part of the tip of the insulation member 20 inside of the intake port 3 can be both avoided, so that the air volume can be reserved, thereby contributing to the enhancement of the engine performance.

Further, since the temperature rise of the intake air can also be suppressed by the insulation member 20, decrease in the intake air volume and generation of knocking can be suppressed, so that the engine performance can also be enhanced from this viewpoint. Furthermore, in cylinder head 1 described above, the insulation member 20 is not disposed at the portion close to the combustion chamber 2 in the intake port 3 and the portion serves as the exposed part 12. With this structure, even if high-temperature gas enters the intake port 3 by the backflow of the exhaust gas, the insulation member 20 can be inhibited from being deteriorated. Incidentally, by smoothing the exposed part 12, even if the cylinder head 1 is used for a long time, it is possible to suppress the deposition of deposits due to the properties of the fuel and lubricating oil, and therefore to suppress the change in combustion performance.

(2) Since the above seal member 21, which is made of an elastic body, can be easily inserted into the main body part 11 and can be easily crushed when the mold 30 is inserted and brought into intimate contact with the seal member 20, the seal member 20 can eliminate the gap by being brought into intimate contact with the mold 30. This structure can avoid leakage of the molten resin and can suppress an increase in the air intake resistance caused by the insulation member 20. If the seal member 21 is made of resin, the seal member 21 is integrated with the molten resin and thereby the air intake resistance can be reduced.

(3) As in the embodiment described above, by forming the seal member 21 and the insulation member 20 with respective different materials, it is possible to select materials suitable for the respective roles. For example, it is possible to further enhance the accuracy in registering of the seal member 21 and also achieve a high sealing effectiveness by forming the seal member 21 with an elastic body. In addition, by selecting a material having a high thermal insulation effect for the insulation member 20, it is possible to arrange the insulation member 20 having a high thermal insulation effect while avoiding leakage of the molten resin by seal member 21.

(4) Since the above step part 14 of the main body part 11 is positioned at the upstream side of the opening 7a of the communicating hole 7 through which the valve guide is inserted, the insulation member 2 can be inhibited from being deteriorated by being affected by high-temperature gas flowing back from the combustion chamber 2.

(5) Furthermore, since the above seal member 21 is provided with the wall parts 21c, the posture of the seal member 21 in a state of being fitted in the step part 14 can be kept so that the accuracy in registering of the seal member 21 can be further enhanced. In addition, since the wall parts 21c are along the inner surface of the covered part 13, the seal member 21 can be easily integrated with the insulation member 20 via the wall parts 21c.

(6) The above main body part 11 is formed in a bifurcated shape, and the step part 14 is located at the bifurcation point 15 of the main body part 11 or at a downstream side of the bifurcation point 15. Since the cross section of the bifurcation point 15 is close to a circular shape, it is possible to apply a load substantially uniformly when the seal member 21 is crushed by inserting the mold 30 so that the amount of crushing the seal member 21 can be uniformed. This structure can enhance the effect for avoiding leakage of the molten resin and can suppress an increase in the air intake resistance caused by the insulation member 20.

(7) Further, in the embodiment described above, there is a shape that the two annular parts 21a are connected. Specifically, the two annular parts 21a can be provided simply by fitting the single seal member 21 into the two step parts 14, so that the accuracy in registering thereof can be further enhanced. Further, it is the shape that the annular parts 21a are connected, which makes it possible to less insert the seal member 21 in a wrong posture.

(8) Since the above connecting part 21b is thinner than each of the annular parts 21a, the seal member 21 can be easily made into a folded state. This makes it possible to easily insert the seal member 21 into the main body part 11, so that the seal member 21 can be easily and precisely fitted into the step part 14 and the accuracy in registering of the annular parts 21a can be further enhanced.

[4. Modification]

The above structure of the cylinder head 1 is an example, and the structure is not limited to this. For example, the embodiment may be applied to a cylinder head for an engine except for a cylinder head of a straight four-cylinder engine, or may be applied to a cylinder head for an engine not having both an in-cylinder injection valve and a port-injection valve. Further alternatively, the present embodiment may be also applied to a cylinder head of an engine that provides one intake valve to every cylinder, a cylinder head that provides two intake valves to every cylinder and that is not bifurcated in the intake port (i.e., one which forms independent ports from the inlet part of the intake port). In this case, the shape of the intake port is not bifurcated, and the seal member provided to a single intake port consists of one annular part.

Further, the embodiment described above assumes that the material of seal member 21 is an elastic body (e.g., resin or rubber), but the material of the seal member 21 is not limited to an elastic member. Furthermore, the seal member 21 and the insulation member 20 may be formed of the same material.

The structure of the intake port 3 described above is an example, and the position of the step part 14 may be different from the position described above. For example, when the intake port 3 has the bifurcation point 15, the step part may be provided at the upstream side of the bifurcation point 15. In addition, if the engine is not provided with a port injection valve, the expanding part 16 is also not necessary. It is satisfactory that at least the exposed part 12 positioned on the side of the combustion chamber 2, the covered part 13 positioned on the upstream side of the exposed part 12 and covered with the insulation member 20, and the step part 14 positioned at the boundary between the exposed part 12 and the covered part 13 are formed in the intake port 3.

The structure of the above insulation member 20 is exemplary and is not limited to that described above. It is satisfactory that the insulation member 20 is at least disposed inside the intake port 3 and is a resin component formed in an annular shape.

The structure of the above mold 30 described above is merely an example, and is not limited to those described above. The above-described embodiment, the sliding mold 30 is assumed to have a shape in which the side molds 34 are also positioned on both sides of the upper mold 31 and the lower mold 32, but the sliding mold 30 may alternatively be one having a center mold having a narrower width and side molds positioned between the upper mold and the lower mold (i.e., only the sides of the center mold). Further, a method of manufacturing the cylinder head 1 (e.g., the sequence of inserting the sliding mold and the sequence of pulling out the sliding mold) is also an example, and is not limited to one described above. If the shape of the intake port is not undercut, a single-shape mold can be used.

DESCRIPTION OF REFERENCE SIGNS 1 cylinder head
2 combustion chamber
3 intake port
4 intake valve hole
7 communicating hole
7a opening
10 cylinder head main body
11 main body part
12 exposed part
13 covered part
14 step part
15 bifurcation point
20 insulation member
21 seal member
21a annular part
21b connecting part
21c wall part

The invention claimed is:

1. A cylinder head comprising:
   a cylinder head main body having an intake port communicating with a combustion chamber of an engine, an expanding part that widens toward a side to which a port injection valve that injects fuel into the intake port is installed, a mounting hole formed at the expanding part for the port injection valve, and an opening of a main body part, which is connected to an intake manifold at an upstream end of the intake port; and
   an insulation member being arranged at an inner side of the intake port, made of resin, and formed into an annular shape, wherein
   a step part is formed at a downstream side of the insulation member in a flow direction of intake air in the intake port such that the intake port has a cross section perpendicular to the flow direction at the downstream side smaller than a cross section perpendicular to the flow direction at an upstream side of the flow direction;
an annular seal member that seals a space between the insulation member and the step part is arranged between the insulation member and the step part; and
a covered part covered with the insulation member is provided at a portion of the main body part from the opening to the step part along an inner surface of the intake port in the cylinder head main body; and
the expanding part and the mounting hole are formed in the covered part.

2. The cylinder head according to claim 1, wherein the seal member is an elastic body.

3. The cylinder head according to claim 2, wherein the seal member and the insulation member are different in material.

4. The cylinder head according to claim 3, wherein
a communicating hole through which a valve guide is placed is formed on the cylinder head main body so as to communicate with the intake port; and
the step part is disposed at an upstream side in the flow direction of an opening of the communicating hole.

5. The cylinder head according to claim 3, wherein
the seal member comprises a wall part along an inner face of the intake port under a state where the seal member is fitted into the step part.

6. The cylinder head according to claim 3, wherein
the intake port is formed into a bifurcated shape that communicates with the combustion chamber through two intake valve holes; and
the step part is positioned at a bifurcation point at which the intake port bifurcates or at a downstream side in the flow direction of the bifurcation point.

7. The cylinder head according to claim 2, wherein
a communicating hole through which a valve guide is placed is formed on the cylinder head main body so as to communicate with the intake port; and
the step part is disposed at an upstream side in the flow direction of an opening of the communicating hole.

8. The cylinder head according to claim 2, wherein
the seal member comprises a wall part along an inner face of the intake port under a state where the seal member is fitted into the step part.

9. The cylinder head according to claim 2, wherein
the intake port is formed into a bifurcated shape that communicates with the combustion chamber through two intake valve holes; and
the step part is positioned at a bifurcation point at which the intake port bifurcates or at a downstream side in the flow direction of the bifurcation point.

10. The cylinder head according to claim 1, wherein
a communicating hole through which a valve guide is placed is formed on the cylinder head main body so as to communicate with the intake port; and
the step part is disposed at an upstream side in the flow direction of an opening of the communicating hole.

11. The cylinder head according to claim 10, wherein
the seal member comprises a wall part along an inner face of the intake port under a state where the seal member is fitted into the step part.

12. The cylinder head according to claim 10, wherein
the intake port is formed into a bifurcated shape that communicates with the combustion chamber through two intake valve holes; and
the step part is positioned at a bifurcation point at which the intake port bifurcates or at a downstream side in the flow direction of the bifurcation point.

13. The cylinder head according to claim 1, wherein
the seal member comprises a wall part along an inner face of the intake port under a state where the seal member is fitted into the step part.

14. The cylinder head according to claim 13, wherein
the intake port is formed into a bifurcated shape that communicates with the combustion chamber through two intake valve holes; and
the step part is positioned at a bifurcation point at which the intake port bifurcates or at a downstream side in the flow direction of the bifurcation point.

15. The cylinder head according to claim 1, wherein
the intake port is formed into a bifurcated shape that communicates with the combustion chamber through two intake valve holes; and
the step part is positioned at a bifurcation point at which the intake port bifurcates or at a downstream side in the flow direction of the bifurcation point.

16. The cylinder head according to claim 15, wherein the seal member comprises two annular parts adapted to fit into the step part in the bifurcated shape and a connecting part that connects the two annular parts.

17. The cylinder head according to claim 16, wherein the connecting part is thinner than each of the annular parts.

18. A cylinder head comprising:
a cylinder head main body having an intake port communicating with a combustion chamber of an engine; and
an insulation member being arranged at an inner side of the intake port, made of resin, and formed into an annular shape, wherein
a step part is formed at a downstream side of the insulation member in a flow direction of intake air in the intake port such that the intake port has a cross section perpendicular to the flow direction at the downstream side smaller than a cross section perpendicular to the flow direction at an upstream side of the flow direction;
an annular seal member that seals a space between the insulation member and the step part is arranged between the insulation member and the step part;
the intake port is formed into a bifurcated shape that communicates with the combustion chamber through two intake valve holes;
the step part is positioned at a bifurcation point at which the intake port bifurcates or at a downstream side in the flow direction of the bifurcation point; and
the seal member comprises two annular parts adapted to fit into the step part in the bifurcated shape and a connecting part that connects the two annular parts.

19. A cylinder head comprising:
a cylinder head main body having an intake port communicating with a combustion chamber of an engine; and
an insulation member being arranged at an inner side of the intake port, made of resin, and formed into an annular shape, wherein
a step part is formed at a downstream side of the insulation member in a flow direction of intake air in the intake port such that the intake port has a cross section perpendicular to the flow direction at the downstream side smaller than a cross section perpendicular to the flow direction at an upstream side of the flow direction;

an annular seal member that seals a space between the insulation member and the step part is arranged between the insulation member and the step part;

the intake port is formed into a bifurcated shape that communicates with the combustion chamber through two intake valve holes;

the step part is positioned at a bifurcation point at which the intake port bifurcates or at a downstream side in the flow direction of the bifurcation point;

the seal member comprises two annular parts adapted to fit into the step part in the bifurcated shape and a connecting part that connects the two annular parts; and the connecting part is thinner than each of the annular parts.

* * * * *